(12) United States Patent
Rachuri et al.

(10) Patent No.: US 11,580,501 B2
(45) Date of Patent: Feb. 14, 2023

(54) AUTOMATIC DETECTION AND ANALYTICS USING SENSORS

(71) Applicant: Samsung Electronics Co., Ltd., Suwon-si (KR)

(72) Inventors: Kiran K. Rachuri, San Jose, CA (US); Jun Yang, Milpitas, CA (US); Enamul Hoque, San Jose, CA (US); Evan Welbourne, San Francisco, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1132 days.

(21) Appl. No.: 14/963,121

(22) Filed: Dec. 8, 2015

(65) Prior Publication Data

US 2016/0162844 A1 Jun. 9, 2016

Related U.S. Application Data

(60) Provisional application No. 62/089,743, filed on Dec. 9, 2014.

(51) Int. Cl.
*G06Q 10/10* (2012.01)
*G10L 15/02* (2006.01)
(Continued)

(52) U.S. Cl.
CPC .......... *G06Q 10/1095* (2013.01); *G10L 17/00* (2013.01); *H04W 52/0251* (2013.01); *H04W 52/0258* (2013.01); *G06Q 10/1093* (2013.01); *G10L 15/02* (2013.01); *G10L 17/02* (2013.01); *Y02D 30/70* (2020.08)

(58) Field of Classification Search
CPC ......... G10L 15/01; G10L 15/20; G10L 17/00; G10L 17/02; G10L 17/04; G06Q 10/1093; G06Q 10/1095
See application file for complete search history.

(56) References Cited

U.S. PATENT DOCUMENTS 7,493,369 B2 2/2009 Horvitz et al.
7,522,060 B1 4/2009 Tumperi et al.
(Continued)

FOREIGN PATENT DOCUMENTS

EP 2500854 A1 9/2012
JP 5433760 B2 12/2013
KR 10-1496714 3/2015

OTHER PUBLICATIONS

Erol et al., "An overview of technologies for e-meeting and e-lecture," 2005 IEEE International Conference on Multimedia and Expo, Jul. 6, 2005 (Year: 2005).*
(Continued)

*Primary Examiner* — Charles Guiliano
*Assistant Examiner* — Sarjit S Bains
(74) *Attorney, Agent, or Firm* — Sherman IP LLP; Kenneth L. Sherman; Hemavathy Perumal

(57) ABSTRACT

A method and device for automatic meeting detection and analysis. A mobile electronic device includes multiple sensors configured to selectively capture sensor data. A classifier is configured to analyze the sensor data to detect a meeting zone for a meeting with multiple participants. A processor device is configured to control the multiple sensors and the classifier to trigger sensor data capture.

20 Claims, 10 Drawing Sheets

(51) Int. Cl.
*G10L 17/00* (2013.01)
*G10L 17/02* (2013.01)
*H04W 52/02* (2009.01)
*G06Q 10/1093* (2023.01)

(56) References Cited

U.S. PATENT DOCUMENTS

| | | | |
|---|---|---|---|
| 8,060,366 B1* | 11/2011 | Maganti | H04L 12/1827 704/246 |
| 8,121,953 B1 | 2/2012 | Qrttung et al. | |
| 8,352,296 B2 | 1/2013 | Taneja et al. | |
| 8,442,578 B2 | 5/2013 | Kass et al. | |
| 8,606,497 B2 | 12/2013 | Doherty et al. | |
| 8,639,650 B1 | 1/2014 | Gill | |
| 8,706,872 B2 | 4/2014 | Moussavian et al. | |
| 8,743,198 B2 | 6/2014 | Padmanabh et al. | |
| 9,443,521 B1* | 9/2016 | Olguin Olguin | G10L 17/00 |
| 9,749,367 B1* | 8/2017 | Kirby | G06Q 10/101 |
| 2006/0074714 A1 | 4/2006 | Aziz et al. | |
| 2006/0200374 A1 | 9/2006 | Nelken | |
| 2007/0071206 A1* | 3/2007 | Gainsboro | H04M 3/2281 379/168 |
| 2008/0059618 A1* | 3/2008 | May | G06Q 10/109 709/223 |
| 2008/0065459 A1* | 3/2008 | Lundell | G06Q 10/109 705/7.19 |
| 2008/0139167 A1* | 6/2008 | Burgess | H04L 12/66 455/404.1 |
| 2008/0160977 A1* | 7/2008 | Ahmaniemi | H04L 12/1822 455/416 |
| 2008/0232277 A1* | 9/2008 | Foo | H04L 12/1822 370/260 |
| 2010/0085416 A1* | 4/2010 | Hegde | H04N 7/147 348/14.08 |
| 2010/0149305 A1* | 6/2010 | Catchpole | G06K 9/00288 348/14.08 |
| 2010/0153160 A1* | 6/2010 | Bezemer | G06Q 10/06 705/7.12 |
| 2010/0318399 A1* | 12/2010 | Li | G06Q 10/109 705/7.18 |
| 2011/0167357 A1* | 7/2011 | Benjamin | H04L 12/1818 715/753 |
| 2011/0292162 A1* | 12/2011 | Byun | H04N 7/147 348/14.08 |
| 2012/0023190 A1 | 1/2012 | Backholm et al. | |
| 2012/0084286 A1 | 4/2012 | Hubner et al. | |
| 2012/0142324 A1 | 6/2012 | Kim et al. | |
| 2013/0132480 A1* | 5/2013 | Tsuji | G06Q 10/06 709/204 |
| 2013/0144603 A1* | 6/2013 | Lord | H04L 67/306 704/235 |
| 2013/0150117 A1* | 6/2013 | Rodriguez | G06T 7/00 455/550.1 |
| 2013/0238392 A1 | 9/2013 | Sloan et al. | |
| 2013/0263020 A1 | 10/2013 | Heiferman et al. | |
| 2013/0290059 A1* | 10/2013 | Troiani | G06Q 10/06315 705/7.19 |
| 2013/0344851 A1 | 12/2013 | Brdiczka et al. | |
| 2014/0012878 A1 | 1/2014 | Moussavian et al. | |
| 2014/0035949 A1* | 2/2014 | Singh | G06Q 10/109 345/629 |
| 2014/0057610 A1* | 2/2014 | Olincy | H04M 3/42365 455/414.1 |
| 2014/0081637 A1* | 3/2014 | Wren | G10L 19/018 704/246 |
| 2014/0164501 A1* | 6/2014 | Herger | H04L 12/1831 709/204 |
| 2014/0247150 A1 | 9/2014 | Proud | |
| 2014/0258413 A1* | 9/2014 | Brieskorn | H04M 3/567 709/204 |
| 2014/0258512 A1 | 9/2014 | Badiee et al. | |
| 2014/0358632 A1* | 12/2014 | Graff | G06F 16/9537 705/7.29 |
| 2014/0372401 A1* | 12/2014 | Goldstein | G10L 25/54 707/706 |
| 2015/0046370 A1* | 2/2015 | Libin | G06Q 10/10 705/345 |
| 2015/0067129 A1* | 3/2015 | Hayashi | H04L 12/1827 709/223 |
| 2015/0111550 A1* | 4/2015 | Kaye | H04W 4/16 455/416 |
| 2015/0142895 A1* | 5/2015 | Beran | H04L 51/04 709/206 |
| 2015/0193819 A1* | 7/2015 | Chang | G06Q 30/0252 705/7.19 |
| 2016/0117624 A1* | 4/2016 | Flores | H04L 67/306 705/7.39 |
| 2017/0270930 A1* | 9/2017 | Ozmeral | G10L 17/005 |
| 2018/0032997 A1* | 2/2018 | Gordon | G06Q 20/3224 |

OTHER PUBLICATIONS

Krause et al., "Context-Aware Mobile Computing: Learning Context-Dependent Personal Preferences from a Wearable Sensor Array", IEEE Transactions on Mobile Computing, vol. 5, No. 2, Feb. 2006 (Year: 2006).*

Ahmed, S. et al., "A Smart Meeting Room with Pervasive Computing Technologies", Proceedings of the 6th International Conference on Software Engineering, Artificial Intelligence, Networking and Parallel/Distributed Computing, 2005 and First ACIS International Workshop on Self-Assembling Wireless Networks (SNPD/SAWN 2005), May 23-25, 2005, pp. 366-371, IEEE, United States.

Wang, J. et al., "A Sensor-fusion Approach for Meeting Detection", Proceedings for the Second International Conference on Mobile Systems, Applications and Services, 2004 MobiSys Workshop on Context Awareness, Jun. 6, 2004, pp. 1-7, United States.

Lovett, T. et al., "The Calendar as a Sensor: Analysis and Improvement Using Data Fusion with Social Networks and Location", Proceedings of the 12th ACM International Conference on Ubiquitous Computing (UbiComp'10), Sep. 26, 2010, pp. 3-12, ACM, United States.

* cited by examiner

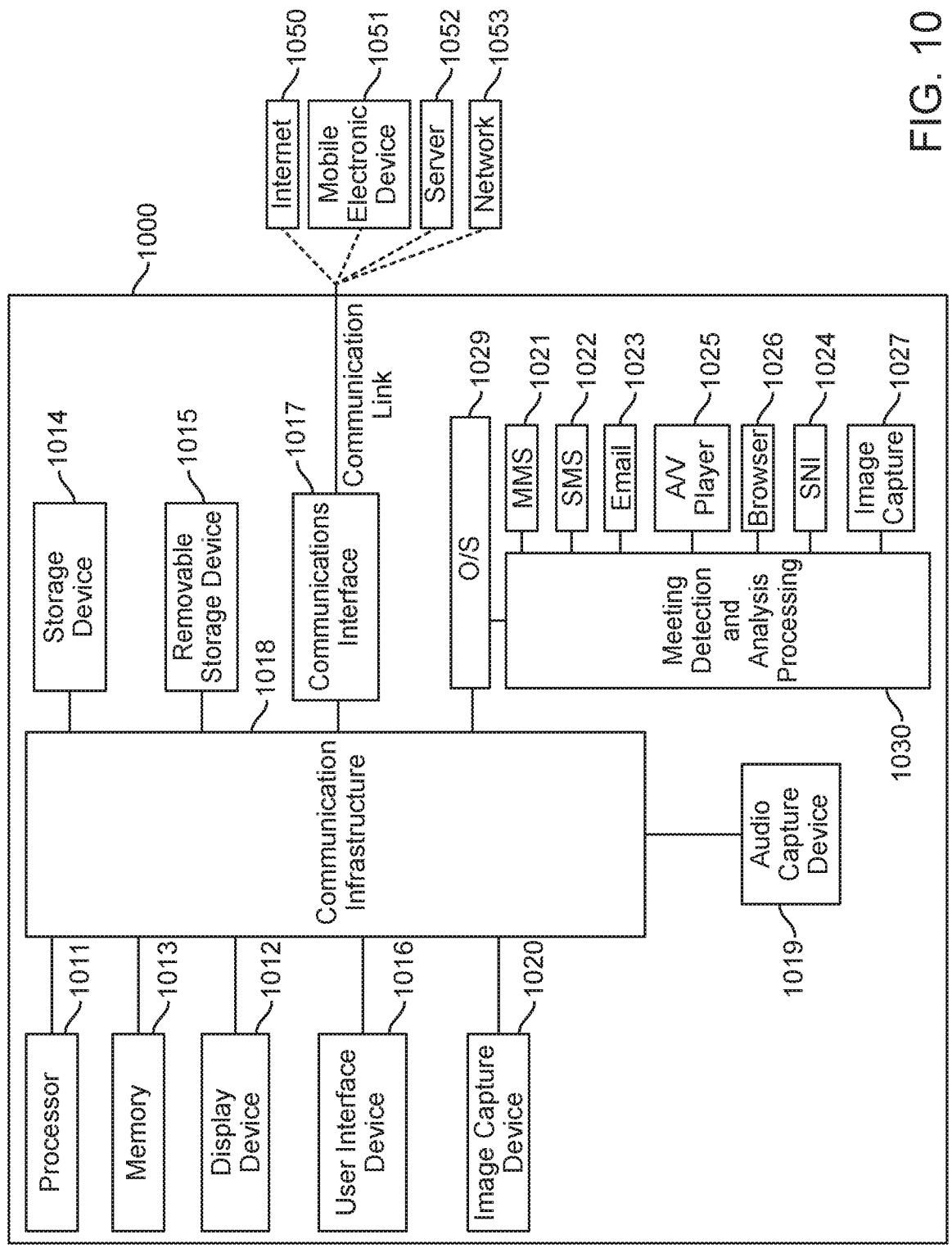

AUTOMATIC DETECTION AND ANALYTICS USING SENSORS

CROSS-REFERENCE TO RELATED APPLICATIONS

This application claims the priority benefit of U.S. Provisional Patent Application Ser. No. 62/089,743, filed Dec. 9, 2014, incorporated herein by reference in its entirety.

TECHNICAL FIELD

One or more embodiments generally relate to conversion of sensor device data for context detection, in particular, to automatic meeting detection and analysis using sensors.

BACKGROUND

Meetings are the most common group activity in organizations. Meetings provide an important point of information exchange, and the social dynamics of meetings often steer the entire organization. The primary means of organizing and managing meetings are calendaring tools or applications. Calendaring tools capture several meeting details (e.g., organizer, participants, location, and agenda) and provide reminders for attendees as the scheduled time approaches. Many meetings, however, do not start or finish at the scheduled time. As such, while calendaring tools are useful for meeting organization, they do not effectively capture how meetings occur in practice.

SUMMARY

One or more embodiments generally relate to automatic meeting detection and analysis. In one embodiment, a mobile electronic device includes multiple sensors configured to selectively capture sensor data. A classifier is configured to analyze the sensor data to detect a meeting zone for a meeting with multiple participants. A processor device is configured to control the multiple sensors and the classifier to trigger sensor data capture.

In one embodiment, a method includes selectively capturing sensor data with multiple sensors. The method further includes analyzing, by a classifier of a mobile electronic device, the sensor data to detect a meeting zone for a meeting with a plurality of participants. The method still further includes controlling, by a processor device of the mobile electronic device, the multiple sensors and the classifier to trigger sensor data capture.

In one embodiment a non-transitory processor-readable medium that includes a program that when executed by a processor performs a method that includes selectively capturing sensor data with multiple sensors. The method further includes analyzing, by a classifier of a mobile electronic device, the sensor data to detect a meeting zone for a meeting with a plurality of participants. The method still further includes controlling, by a processor device of the mobile electronic device, the multiple sensors and the classifier to trigger sensor data capture.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 10 is a high-level block diagram showing an information processing system comprising a computing system implementing one or more embodiments.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Embodiments relate to automatic meeting detection, analysis and management. In one embodiment, a mobile electronic device includes multiple sensors configured to selectively capture sensor data. A classifier is configured to analyze the sensor data to detect a meeting zone for a meeting with multiple participants. A processor device is configured to control the multiple sensors and the classifier to trigger sensor data capture, and reduce energy usage for the mobile electronic device based on calendar information and the sensor data.

In one or more embodiments, a smartphone system that detects and analyzes meetings in the workplace. The system includes sensor pipelines for accelerometer, microphone, and location sensors that generate inferences which are fused to precisely determine a meeting zone, and estimate when meetings start and finish. One or more embodiments use these inferences to trigger analytics subsystems that extract keywords from calendar applications and speech, and which identify speakers and their participation levels. This closes the loop by providing quantitative behavioral analytics to the user. Detected meetings are logged into a database on the smartphone and indexed by keywords, speaker participation rates, and location so that they can be easily retrieved by the user. The entire system runs solely on a smart electronic device (e.g., a smartphone, a wearable, etc.) without any assistance from the cloud or external sensors.

Figure 1:
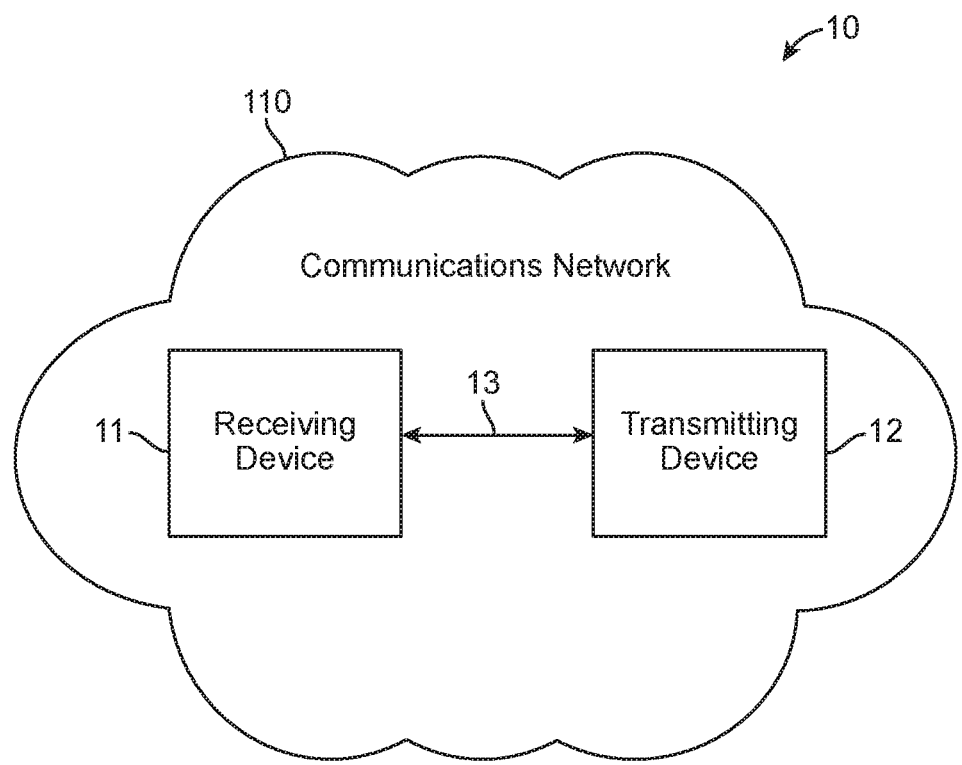
FIG. 1 shows a schematic view of a communications system, according to an embodiment.

FIG. 1 is a schematic view of a communications system 10, in accordance with one embodiment. Communications system 10 may include a communications device that initiates an outgoing communications operation (transmitting device 12) and a communications network 110, which transmitting device 12 may use to initiate and conduct communications operations with other communications devices within communications network 110. For example, communications system 10 may include a communication device (receiving device 11) that receives the communications operation from the transmitting device 12. Although communications system 10 may include multiple transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), BLUETOOTH®, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices (e.g., a BLACKBERRY®). Such protocols may include, for example, GSM, GSM plus EDGE, CDMA, quadband, and other cellular protocols. In another example, a long range communications protocol can include Wi-Fi and protocols for placing or receiving calls using VOIP, LAN, WAN, or other TCP-IP based communication protocols. The transmitting device 12 and receiving device 11, when located within communications network 110, may communicate over a bidirectional communication path such as path 13, or over two unidirectional communication paths. Both the transmitting device 12 and receiving device 11 may be capable of initiating a communications operation and receiving an initiated communications operation.

The transmitting device 12 and receiving device 11 may include any suitable device for sending and receiving communications operations. For example, the transmitting device 12 and receiving device 11 may include mobile telephone devices, television systems, cameras, camcorders, a device with audio video capabilities, tablets, wearable devices, other smart devices, and any other device capable of communicating wirelessly (with or without the aid of a wireless-enabling accessory system) or via wired pathways (e.g., using traditional telephone wires). The communications operations may include any suitable form of communications, including for example, voice communications (e.g., telephone calls), data communications (e.g., e-mails, text messages, media messages), video communication, communications with calendaring applications, or combinations of these (e.g., video conferences).

Figure 2:
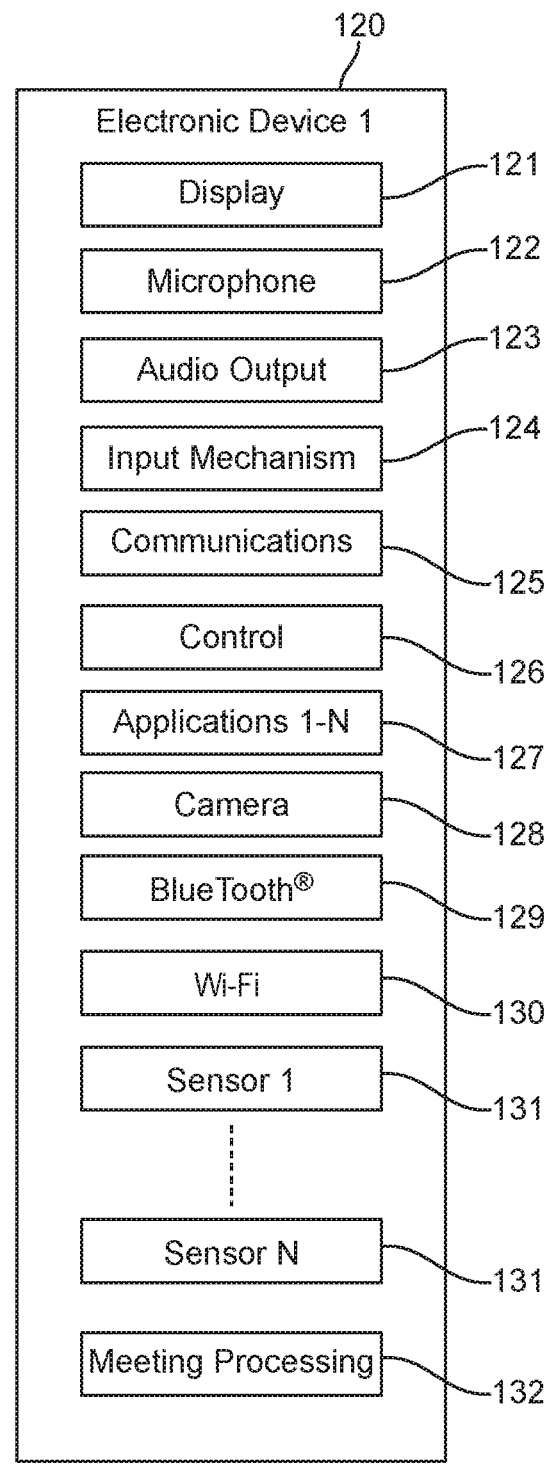
FIG. 2 shows a block diagram of architecture for a mobile electronic device system including meeting processing, according to an embodiment.

FIG. 2 shows a functional block diagram of a mobile electronic device 120 that may be used for automatic meeting zone detection and meeting analysis, according to one embodiment. Both the transmitting device 12 and receiving device 11 may include some or all of the features of the electronics device 120. In one embodiment, the electronic device 120 may comprise a display 121, a microphone 122, an audio output 123, an input mechanism 124, communications circuitry 125, control circuitry 126, Applications 1-N 127 (e.g., a calendaring application), camera 128, a BLUETOOTH® interface 129, a Wi-Fi interface 130 and sensors 1 to N 131 (N being a positive integer), meeting processing 132 (e.g., meeting processing using one or more processors, sensor data, Wi-Fi information, etc.) and any other suitable components. In one embodiment, applications 1-N 127 are provided and may be obtained from a cloud or server via a communications network 110, etc., where N is a positive integer equal to or greater than 1.

In one embodiment, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In one embodiment, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., BLUETOOTH® headphones or a BLUETOOTH® headset).

In one embodiment, the display 121 may include any suitable screen or projection system for providing a display visible to the user. For example, display 121 may include a screen (e.g., an LCD, LED, etc. screen) that is incorporated in the electronics device 120. Display 121 may be operative to display content (e.g., information regarding communications operations or information regarding available media selections) under the direction of control circuitry 126.

In one embodiment, input mechanism 124 may be any suitable mechanism or user interface for providing user inputs or instructions to electronics device 120. Input mechanism 124 may take a variety of forms, such as a button, keypad, dial, a click wheel, or a touch screen. The input mechanism 124 may include a multi-touch screen.

In one embodiment, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), BLUETOOTH®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the Bluetooth® protocol to couple the electronics device 120 with a BLUETOOTH® headset.

In one embodiment, control circuitry 126 may be operative to control the operations and performance of the electronics device 120. Control circuitry 126 may include, for example, one or more processors, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In one embodiment, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include a calendaring application (e.g., MICROSOFT® OUTLOOK®, GOOGLE® Calendar, etc.), an automatic speech recognition (ASR) application, a dialog application, a map application, a media application (e.g., QuickTime, MobileMusic.app, or MobileVideo.app), social networking applications (e.g., FACEBOOK®, TWITTER®, INSTAGRAM®, etc.), an Internet browsing application, etc. In some embodiments, the electronics device 120 may include one or multiple applications operative to perform communications operations. For example, the electronics device 120 may include a messaging application, a mail application, a voicemail application, an instant messaging application (e.g., for chatting), a videoconferencing application, a fax application, or any other suitable applications for performing any suitable communications operation.

In some embodiments, the electronics device 120 may include a microphone 122. For example, electronics device 120 may include microphone 122 to allow the user to transmit audio (e.g., voice audio) for speech control and navigation of applications 1-N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In one embodiment, the camera 128 comprises one or more camera devices that include functionality for capturing still and video images, editing functionality, communication interoperability for sending, sharing, etc., photos/videos, etc.

In one embodiment, the BLUETOOTH® interface 129 comprises processes and/or programs for processing BLUETOOTH® information, and may include a receiver, transmitter, transceiver, etc.

In one embodiment, the electronics device 120 may include multiple sensors 1 to N 131, such as accelerometer, gyroscope, microphone, temperature, light, barometer, magnetometer, compass, radio frequency (RF) identification sensor, global positioning system (GPS), Wi-Fi, etc. In one embodiment, the multiple sensors 1-N 131 provide information to the meeting processing 132. In one embodiment, the multiple sensors 1-N 131 may be aggregated or used from different electronic devices, such as an electronic device 120 (e.g., a smartphone) and another electronic device 120 (e.g., a wearable device such as a smartwatch). For example, a gyroscope sensor and/or a temperature may be used from a wearable device, and a microphone sensor may be used from a smartphone.

In one embodiment, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

Figure 3:
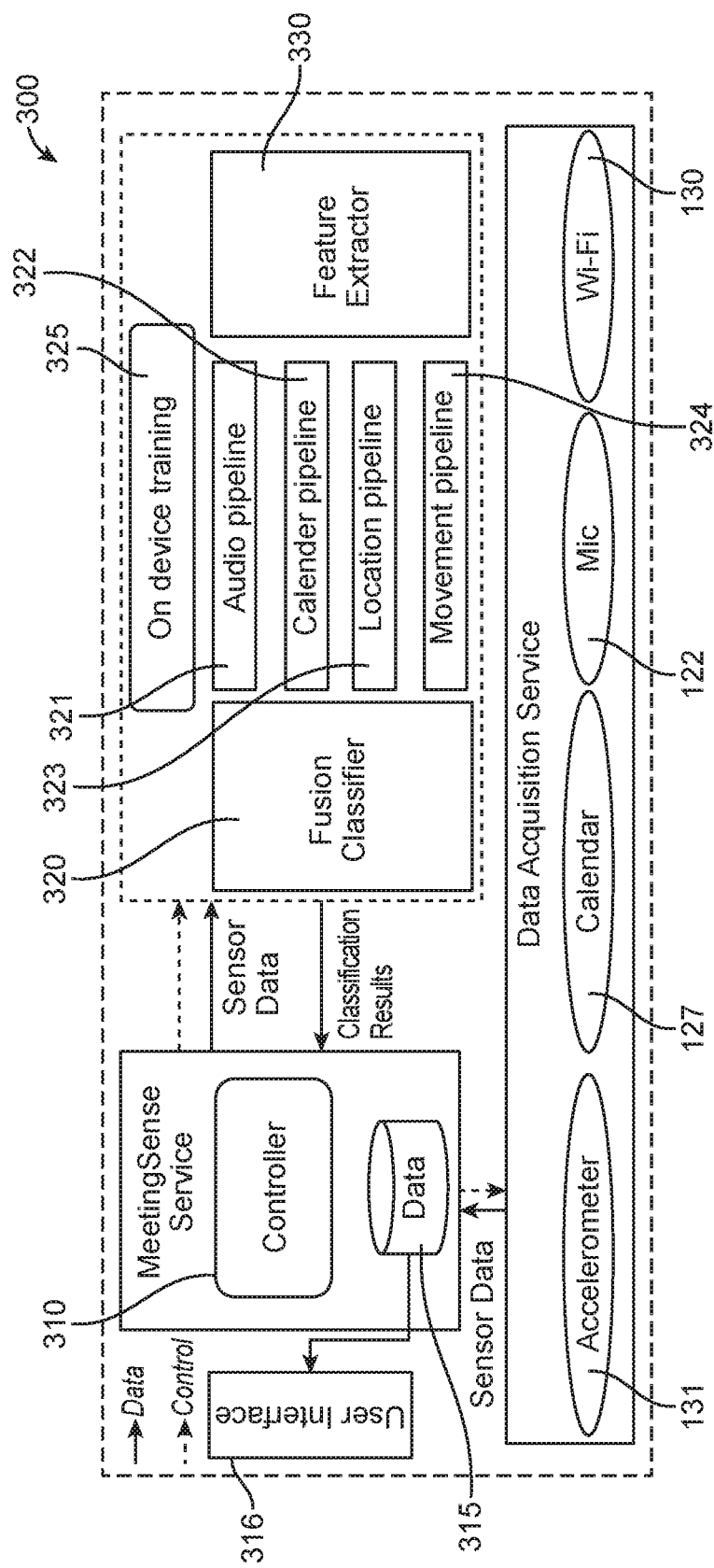
FIG. 3 shows a system architecture for meeting processing, according to an embodiment.

FIG. 3 shows a system architecture 300 for meeting processing 132 (FIG. 2), according to an embodiment. System 300 includes a controller 310 (e.g., one or more processors, one or more processors executing instructions stored in a memory), user interface 316, storage 315, a (fusion) classifier 320, sensor 131 (accelerometer), calendar application 127, microphone 122 and Wi-Fi 130. In one embodiment, the classifier 320 uses an audio pipeline 321, a calendar pipeline 322, a location pipeline 323 and a movement pipeline 324 for sensor fusion. In one embodiment, the system 300 performs on device training 325 (e.g., audio training, location training, etc.) and includes a feature extractor 330 that extracts features from sensor data, such as audio amplitude, Fast Fourier Transforms (FFTs) and Mel Frequency Cepstral Coefficients (MFCC).

In one embodiment, the system 300 uses Wi-Fi 130, microphone 122, and accelerometer 131 to detect indoor location, speech, and movement, respectively. The system 300 also processes the user's calendar application 127 data to determine whether a scheduled event represents a real meeting or is just a reminder. This inference can be used to save power by triggering sensor pipelines only for real meetings as described below. Further, as it is not practical to obtain all meeting location fingerprints beforehand, in one embodiment an on-device training 325 feature is implemented where users can update the meeting location model in real-time using their mobile electronic devices 120 (FIG. 2). The following components are included to analyze the content of detected meetings: i) speaker identification: determines the fraction of time each participant speaks during the meeting; ii) calendar keyword extraction: extracts keywords from the title and description of calendar events; and iii) speech keyword extraction: extracts keywords from the meeting dialogue.

In one embodiment, the system 300 implements two applications based on meeting status inference: when the system 300 detects that the user is in a meeting, the mobile electronic device 120 is silenced; if the user receives a call while being in a meeting, an automatic SMS message is sent to the caller informing that the user is busy in a meeting. In one embodiment, the system 300 preserves the privacy of the user by executing solely on the mobile electronic device 120 (e.g., not transmitting data externally to a cloud or server), not storing raw audio data on the mobile electronic device 120, and for analytics, only storing the speech percentage information and deleting the raw audio data after processing.

The data acquisition service portion of system 300 continuously runs in the background of the mobile electronic device 120 and periodically collects data from various sensors, such as accelerometer 131, microphone 122 and radios, such as Wi-Fi 130 and software sensors, such as calendar application 127. The system 300 collects X, Y, Z axes data from the mobile electronic device 120, accelerometer 131 sensor, raw microphone audio signal values from the microphone 122 sensor, Wi-Fi access point device IDs and their received Signal Strength Indication (RSSI) values from Wi-Fi 130, and current calendar entries from all the calendars applications (e.g., calendar application 127, etc.) accessible to the mobile electronic device 120.

In one embodiment, in order to make sure that the data from these sensors correspond to the same time period, the data acquisition service queries data from all the sensors in different threads at the same time. In each cycle of data collection, the system 300 collects a window of data, e.g., an audio window corresponds to 3 seconds of microphone data. The collected data is then sent in their raw form to the individual sensor pipelines for further processing. As the collected sensor data can be highly privacy sensitive, e.g., audio data, the system 300 does not store any sensor data to preserve the privacy of the user (only processed output is stored, such as meeting start, meeting end, speech percentages, etc., without storing raw audio).

The location pipeline 323 is described below, according to one or more embodiments. A formal meeting in an organization typically happens at an indoor conference room. As an interaction in a meeting room often indicates that there is an on-going meeting, the system 300 infers whether the user is in a meeting room or not based on such information. In one embodiment, two coarse categories are defined: meeting zone and non-meeting zone. All the meeting rooms in an organization form the meeting zone category while the remaining spaces (e.g., cubicles, cafeteria, corridors, etc.) form the non-meeting zone category. The system 300 uses the location pipeline to estimate whether the user is in a meeting zone or not.

Wi-Fi fingerprinting may be used to achieve accurate room-level localization without adversely impacting the battery of the mobile electronic device 120. In one embodiment, the system 300 captures a Wi-Fi fingerprint or signature by performing multiple Wi-Fi scans, each time the user is in a meeting room and ties the signature to the meeting zone class. The wireless signature includes all scanned media access control (MAC) addresses of the access points observed by the Wi-Fi 130 and the number of times a beacon frame was received from each access point. The MAC addresses (or broadcast service set identifications ($BSSID_S$)) are collected instead of the service set identifications ($SSID_S$) is that, in a professional working environment, usually a common secured SSID is shared by multiple access points in different buildings or floors. Using Wi-Fi fingerprints from the MAC addresses captures the user's indoor location dynamics better than a single SSID. In one example, a received Wi-Fi signature is represented by index s as two sets: $M_s=\{m_s(1), m_s(2), \ldots, m_s(N)\}$ and $R_s=\{r_s(1), r_s(2), \ldots, r_s(N)\}$ where $m_s(n)$ is the MAC address and $r_s(n)$ is the beacon reception ratio for access point n, and N is the total number of access points observed in all the scans over the duration of meeting. Suppose the total number of scans is S over a time window, the beacon reception ratio $r_s(n)$ is defined as the number of beacons received from access point n divided by S. From $R_s$, a set of normalized beacon reception ratio $\bar{R}_s$ is defined as the Wi-Fi fingerprint of each meeting room, $\bar{R}_s=\{\bar{r}_s(1), \bar{r}_s(2), \ldots, \bar{r}_s(N)\}$ where $\bar{r}_s(n)=r_s(n)/\Sigma_{s=1}^{N} r_s(n)$.

In one embodiment, system 300 detects a user entering a meeting room by computing real-time generated signature sets $M_t$ and $R_t$ with pre-learned signature sets $M_s$ and $R_s$, where s represents the index of each meeting room. A matching function is defined between pre-learned signature and current signature as $$P_s = \Sigma_{\{n|m_s(n) \in M_s \cap M_t\}} \bar{r}_s(n)$$

This matching function considers long-term statistics for all possible access points received at the meeting room, including the ones with lower beacon reception ratios. Similarly, Wi-Fi fingerprints can be defined and computed for those non-meeting places, such as cubicles, cafeteria, corridors, etc.

As system 300 is mainly interested in whether a mobile user is in a meeting zone or not, the matching function between current signature and either of the zones can be computed by taking a maximum or a weighted average of all $P_s$ in that zone. If the matching functions of both zones are below an empirical threshold τ, the user's location is estimated to be in an unknown zone that has no Wi-Fi fingerprints; otherwise, a binary classifier is used by comparing two matching functions from each zone to decide whether the user is in the meeting zone or not. As it is not practical to capture the fingerprints of all the meeting rooms in an organization beforehand, in one embodiment on device training 325 processing is implemented for detecting meeting zones.

The movement pipeline 324 is described below, according to one or more embodiments. Since most meetings occur in conference/meeting rooms, a user typically needs to walk from her space to the meeting room for attending the meeting and walk back to her workspace (e.g., a cubicle or office) after the meeting. In one embodiment, system 300 uses accelerometer 131 as an auxiliary input to detect the user's motion states that can act as cues to detect start or finish of a meeting. Given a fixed window of accelerometer 131 data (e.g., 4 seconds), system 300 computes the mean and standard deviation of the magnitude vector α from std(α) original 3D accelerometer vector, denoted by mean (α) and std(α) separately. A sufficient statistics ratio, r=std(α)/mean(α), is composed to measure whether the mobile electronic device 120 is stationary or not by comparing it with a predefined movement threshold calculated empirically. When a mobile user is moving, this ratio r is usually significantly higher than when she is stationary. After buffering user's motion states over a few consecutive windows, a majority-voting based smoothing technique is applied on the buffer to infer whether the user is moving or stationary.

Electronic calendars (e.g., MICROSOFT® OUTLOOK®, GOOGLE® Calendar) have become common in offices to initiate meetings, send invitations to participants, and book meeting rooms. As these calendar applications are accessible from everywhere (e.g., desktops, mobile smart devices, and tablets), they have become ubiquitous for meeting management. Therefore, meeting data collected from the electronic calendar applications can be an excellent source for detecting meetings. However, people often use calendars to manage other personal events, i.e., non-office meetings. For example, people may use calendars to set up reminders, or to schedule personal appointments. Consequently, not all events in a calendar correspond to office meetings.

In one embodiment, the function of the calendar pipeline 322 is to extract all calendar events from a calendar application 127 and automatically detect the real meetings in office by filtering out personal events and reminders. Only a fraction of the calendar events represents actual office meetings. The calendar pipeline 322 aims to filter out all the events except organizational meetings using the features extracted from them. Accurately identifying a real meeting event helps in activating system 300 only when required to minimize the energy consumption, for instance, well before a scheduled meeting to account for errors in calendar application 127.

The following describes the different features of calendar application 127 events used in the calendar pipeline 322, according to one embodiment. Number of Participants: many personal reminders and non-office appointments that are in the calendar application 127 may not involve other participants except the user. On the other hand, all calendar application 127 events corresponding to real meetings have multiple participants. Therefore, the system 300 uses the number of participants in a meeting (which can be extracted from the calendar application 127) as a feature.

Time of Day and Duration: most meetings in organizations take place during office hours and durations of these meetings are within a certain range. Therefore, temporal features might be effective in differentiating organizational meetings from others. Organizer: meetings in an organization are typically organized by the user's colleagues. In one embodiment, system 300 includes the meeting organizer as a categorical feature in the pipeline.

Location: meetings take place in specific conference rooms in an organization. Reminders and personal appointments in the user's calendar application 127 either typically have outside locations or have no location at all. This information may be a useful feature for filtering out non-work events. In one embodiment, system 300 takes a classifier based approach for detecting real meetings from the calendar events. In one embodiment, the system 300 collects labeled calendar events (each calendar event is labeled as being a real meeting or not) from users for training the (fusion) classifier 320. As calendar events can be highly sensitive, users can choose to filter out certain events that are private. In one embodiment, decision tree or rule based models may be used for classifying the calendar events.

Figure 4:
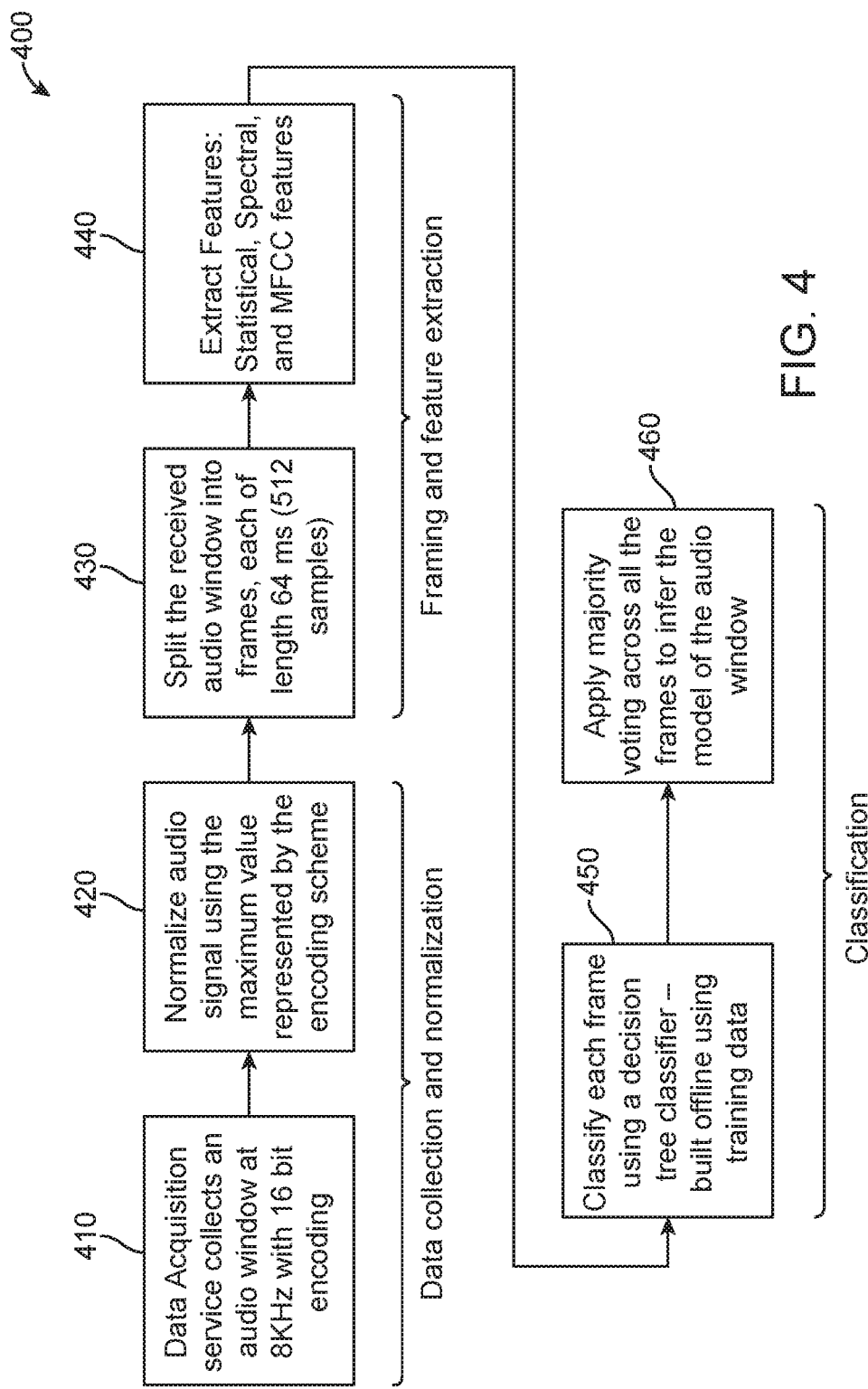
FIG. 4 shows an audio flow pipeline, according to an embodiment.

FIG. 4 shows a flow 400 for the audio pipeline 321, according to an embodiment. The audio pipeline assists in detecting meetings by accurately detecting verbal conversations in organizations. Further, the audio pipeline 321 also aims to support speaker identification (which is described below) for analyzing meeting dialogue. The audio pipeline 321 involves several stages to process and classify the microphone 122 data received from the data acquisition service.

In one embodiment, in block 410 the data acquisition service captures audio samples at window level (e.g., 5 seconds) at 8 KHz using a 16 bit encoding in raw form such as pulse-code modulation (PCM) format. Once the audio pipeline receives an audio window, in block 420 it first normalizes the audio signal value, which helps in reducing the variance across different mobile electronic devices 120 (e.g., different smartphones) with diverse microphone capabilities. Since the data acquisition uses 16 bit encoding for capturing audio, the audio pipeline 321 normalizes each signal value by dividing it with the maximum value represented by this encoding.

In one embodiment, a sampling rate of 8 KHz is used by system 300, which is a typical value used by mobile audio sensing works. An audio window contains many individual samples depending on its window size (e.g., 3 seconds, 5 seconds, etc.). In one embodiment, in block 430 the audio pipeline 321 then converts a given window into many short frames, each of length 64 milliseconds to apply Fourier transforms on a 512 sample length frame (64 ms×8 KHz).

In one embodiment, in block 440 for each frame, a set of audio features are extracted that includes simple statistical features such as absolute amplitude mean as well as more advance spectral and MFCC features. In one embodiment, the extracted features are stored in the feature extractor 330 (FIG. 3).

Once features are extracted from a frame, in block 450 the features are classified using a decision tree to estimate whether the frame represents a voice, non-voice, or silence. In one example, a C4.5 model is used for representing the audio decision tree.

Once all the frames in a given audio window have been classified, in block 460 a majority voting is applied on the classified outputs of all the frames to determine the classification output for the window. The majority voting scheme assigns the model with the highest number of votes as the model of the audio window.

In one embodiment, if the audio sample is classified as a voice sample then it is further processed to identify the speaker of the sample. Invoking speaker identification only when an audio sample contains voice data improves the efficiency of the system by minimizing redundant computation.

In one embodiment, the audio pipeline 321 uses several features to train its decision tree model and to classify an audio sample in real-time. In the following, a detailed overview of the features used by the audio pipeline 321 are described.

In one embodiment, the audio pipeline 321 uses mean, standard deviation (Std), and Root Mean Square (RMS). In one example, the audio pipeline 321 uses mean and Std of the normalized absolute audio signal values for a given frame. RMS is the quadratic mean of the audio signal values. Since the amplitude of silence is close to zero, these basic statistical features are helpful in differentiating silence from speech and ambient noise. Zero crossing rate (ZCR) is the number of time-domain crossings over zero in a given frame, i.e., the number of times the audio signal value changes from positive value to negative value and vice versa. ZCR is quite useful for discriminating human speech from music as human voice shows a higher variance in ZCR than music or ambient noise. In one embodiment, the following spectral features are used by system 300: spectral bandwidth, spectral roll-off, spectral centroid, and spectral flux. These frequency domain features have been found to be highly effective in audio classification. Music generally contains more diverse frequencies, therefore, spectral bandwidth can be used to differentiate it from other sounds as it is a measure of the width of the range of frequencies. Spectral flux and roll off can also be useful for distinguishing music from human voice as these are higher for the former than the latter.

In one embodiment, MFCC coefficients are useful in audio classification, especially for speaker identification. In addition to sound classification, system 300 also aims to analyze meeting dialogue by performing speaker identification and displaying visualizations with speaker percentages for analytic feedback. In one embodiment, MFCC features are included in the audio pipeline 321. In one example embodiment, a total of 13 MFCC features are used that include 12 MFCC coefficients and MFCC energy extracted from a given frame.

Figure 5:
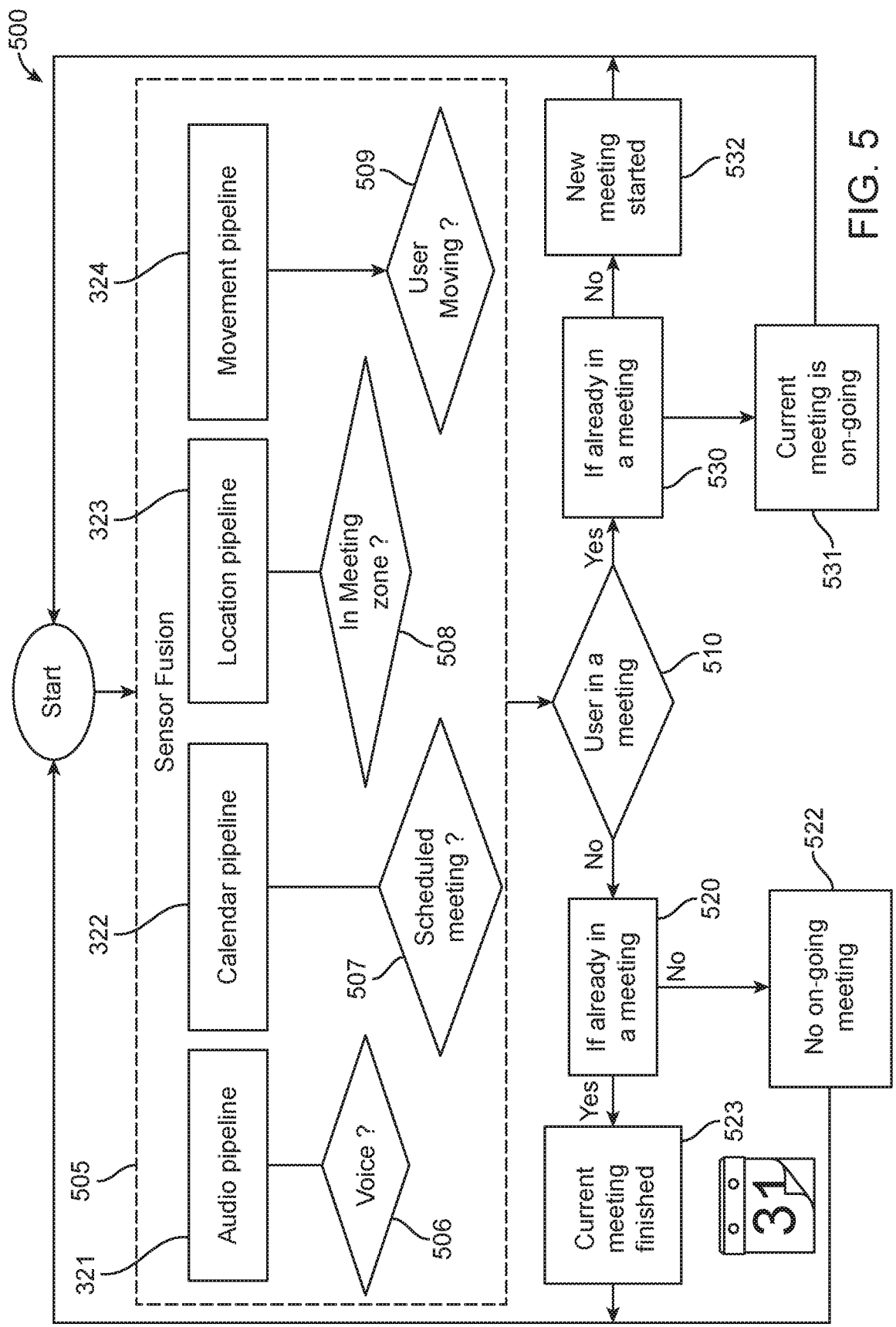
FIG. 5 shows a flow of meeting detection using sensor fusion classifier, according to an embodiment.

FIG. 5 shows a flow 500 of meeting detection using sensor fusion 505, according to an embodiment. Each of the sensing pipelines described above so far captures a specific meeting-related context. For example, the audio pipeline 321 detects conversations, the movement pipeline 324 detects movement (using the accelerometer sensor) and the location pipeline 323 detects whether the user is in a meeting zone. However, these individual pipelines need to be combined to infer whether the user is in a meeting or not. In one embodiment, system 300 takes a multi-modal context fusion approach to combine all sensor inputs. The data acquisition service captures sensor data in cycles and provides them to the sensing pipelines. After pipelines classify the data from a cycle, the outputs are sent to the (fusion) classifier 320.

In one embodiment, classifier fusion first combines individual classifiers' outputs and forms a fusion window. To simplify the process, all the outputs are translated into binary inputs for the classifier fusion, determination 506: such as voice (1) vs. non-voice (0), determination 507: such as scheduled meeting event (1) or no scheduled meeting event (0), determination 508: such as meeting zone (1) vs. non-meeting zone (0), and determination 509: such as moving (1) vs. stationary (0), in current time window.

In one embodiment, inside each fusion window of an individual classifier's outputs, a majority-voting based smoothing technique is applied on the binary outputs to remove random outputs. To keep the temporal correlation, a sliding-window based decision buffer with certain constraint length and 80% overlapping window is cached to receive consecutive smoothed outputs from each fusion window. A sequence detector continuously discover output switching patterns for indoor meeting zone transition, voice transition, movement transition, and also record possible calendar schedule changes. Finally, by combining all the transitional patterns, a meeting start is declared by capturing meeting zone and voice transition pattern from 0 to 1, plus movement transition pattern from 0 to 1 and then back to 0, confirmed by possible meeting schedule changes from 0 to 1. A meeting end is announced by capturing meeting zone and voice transition pattern from 1 to 0, and movement transition pattern from 0 to 1 and then finally back to 0 sometimes, enhanced by possible meeting schedule changes from 1 to 0 that may happen before or after the real meeting end.

In one embodiment, based on the binary results, at block 510 it is determined if a user is in a meeting or not. If it is determined that a user is in a meeting, the flow 500 proceeds to block 530 where it is determined if the user is already in a meeting. If it is determined that the user is already in a meeting, the flow 500 proceeds to block 531 where it is determined that the current meeting is ongoing, and the flow proceeds back to the sensor fusion 505. If it is determined in block 530 that the user was not already in a meeting, then the flow 500 proceeds to block 532 where it is determined that a new meeting has started and the flow then proceeds back to sensor fusion 505.

In one embodiment, if block 510 determines that the user is not in a meeting, the flow 500 proceeds to block 520 where it is determined if the user was in a meeting. If it is determined in block 520 that the user was not in a meeting, then the flow 500 proceeds to block 522 where a determination of no on-going meeting is made and the flow 500 proceeds to sensor fusion 505. If it is determined in block 520 that the user was in a meeting, and is no longer in a meeting, the flow proceeds to block 523 where a determination is made that the current meeting has finished, and the flow 500 proceeds back to fusion sensor 505.

Figure 6:
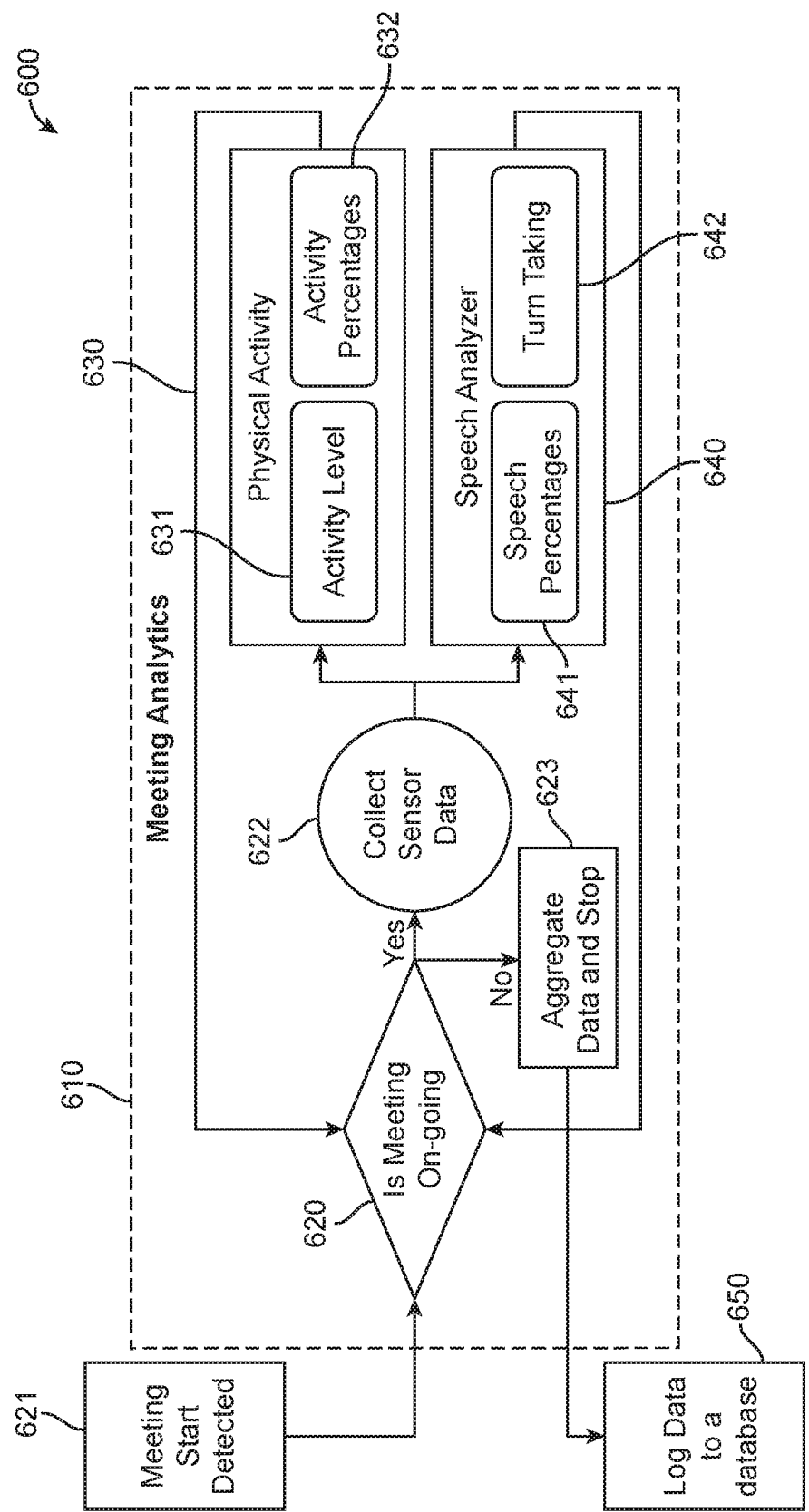
FIG. 6 shows a flow for real-time analysis of meeting data to provide analytics, according to an embodiment.

FIG. 6 shows a flow 600 for real-time analysis of meeting data to provide meeting analytics 610, according to an embodiment. Behavioral patterns of users vary considerably across different types of meetings. For instance, a user might be an active participant in one-to-one meetings while barely speaking in group meetings. Further, a user might be an active speaker in meetings held during the morning than in the evening. Capturing and displaying patterns like these as feedback to the user are useful for self-reflection and highly effective for improving one's conversational skills. In one embodiment, a speaker identification component recognizes the speaker of the conversation. Using this component, the system 300 provides a utility that computes the speech percentages of all the speakers in the meeting and shows them visually in the user interface of system 300.

In one embodiment, the meeting analytics 610 receives information from block 621 that a meeting start has been detected. In block 620, it is determined if the meeting is on-going or not. If it is determined that the meeting is not on-going, the flow 600 proceeds to block 623 where the data is aggregated and the system 300 stops and proceeds to block 650 to log data in a database or other memory data structure on the mobile electronic device 120 (FIG. 2). If it is determined in block 620 that the meeting is on-going, the flow 600 proceeds to block 622.

In one embodiment, in block 622 sensor data is collected. The sensor data that is collected is analyzed by the physical activity analyzer 630 and the speech analyzer 640. The physical activity analyzer includes an activity level 631 determination and activity percentages 632 determination. The speech activity analyzer 640 includes a determination for speech percentages 641 and turn taking 642.

In one embodiment, once a meeting zone is detected, the speaker identification component is triggered by the audio pipeline 321 when the voice classifier detects that the audio sample contains human voice. In one embodiment, the pipeline for speaker identification may be the same as that described in the audio pipeline 321, i.e., an audio sample is divided into frames of certain length (e.g., 64 ms) and classified at frame level. The system 300 (FIG. 3) applies a majority voting scheme on all the frames in a given audio window to infer the speaker of the audio window. Classifiers, such as a decision tree classifier and a Gaussian mixture model (GMM) classifier may be used for performing speaker identification.

In one example embodiment, a decision tree classifier, such as the C4.5 decision tree classifier, may be used for performing the speaker identification. The decision tree classifier is trained using pre-collected speaker data—similar to the voice/non-voice classification described before. The system 300 prunes the tree to avoid over-filling of the tree model to the training data. MFCC features may be used for speaker identification. Since MFCC features are already part of the audio pipeline 321 feature extraction, the same set of features described in the audio pipeline 321 for decision tree based speaker classification may be implemented.

In one example embodiment, a GMM based classifier may be used for speaker identification as GMM based classifiers achieve high accuracy while being feasible to be able to run on a mobile electronic device 120 (FIG. 2). Since most meetings in organizations involve multiple participants, the design needs to implement a computationally efficient GMM classifier to be able to run on a mobile electronic device 120. Therefore, in one example the system 300 only uses the MFCC features to construct the GMM model of each speaker so that the dimension of inherent multivariate Gaussian distribution is not more than thirteen. On the other hand, the number of clusters (or mixtures) employed by the GMMs plays an important role in the performance of speaker identification. In one embodiment, a selection is made for the optimum number of clusters, which may be determined by running different processes and determining the optimum number of clusters by comparison.

An additional advantage of using GMM for speaker identification is that, by design, it supports detecting unknown speakers (i.e., speakers that are not already known to the system). In one example, the approach of significant hypothesis testing may be used to design an unknown speaker model unlike the approach of a background model. Based on each GMM, the likelihood threshold $\theta_m$ of a particular speaker m is estimated using the percentile cut-off of the likelihood of the training data. The empirical cut-off probability can be chosen at the 10th percentile to balance precision and recall of each individual GMM-based classifier.

People participate in a number of meetings in the office each week, and it is difficult to recall all the details of the meetings after a few days. This is exacerbated by the fact that users typically attend a diverse set of meetings. If the agenda of each meeting can be represented with a set of keywords, then it is possible to group meetings with similar agenda. Such grouping helps in indexing of meetings for later recall. A trivial way for assigning keywords to meetings is to have the users label them. However, as this process is involved, it would be a burden on the user.

In one embodiment, keywords are automatically assigned to meetings based on the available resources. A data source that is commonly available for organizational meetings is the title and description of the calendar meeting entries. Another possible source of information are the emails and text messages exchanged among the participants of the meetings, however, they are highly sensitive to be used in practice. In one embodiment, the calendar events corresponding to meetings for which users grant access are used as a data source. A challenge posed by the calendar entries is that the text in the title and description of the calendar events corresponding to meetings might be very short. Conventional algorithms that extract keywords from text require a large volume of data which may not be practical for implementation on a mobile electronic device 120 as it has access only to the user's calendar data. In one embodiment, a keyword extraction approach on the limited text that the system 300 has access to is employed. In one example, the system 300 uses the Apache OpenNLP library to identify the proper nouns and groups of nouns in the text, and uses them as keywords. Considering this approach as the baseline, a number of policies to extract keywords from meetings may be defined, which are described below.

'Only Current Meeting Keywords' Policy: in this policy, the system 300 only extracts keywords from the title and description of the current meeting.

'Union of Participants keywords' Policy: in this policy, in addition to the keywords from the current meeting, the system 300 extracts keywords from all the calendar events of all the participants and perform the union of them. The intuition is that by extracting keywords from all the calendar events of a participant, the system 300 can retrieve all the meeting topics that the participant is involved in. By taking the union, the system 300 covers the topics from all the participants, and thus obtains a comprehensive list of keywords.

'Intersection Participants keywords' Policy: in this policy, in addition to the keywords from the current meeting, the system 300 extracts keywords from all the calendar events of all the participants and only select the common keywords. Therefore, this policy ensures that the selected topics are common to all participants in a meeting.

In one embodiment, a comparison may be performed to select the best policy. In other embodiments, the policy is pre-determined based on prior analysis of samples for a particular organization.

Segregating meetings based on keywords is an initial step towards summarizing all the meetings. Another important functionality in this regard is to summarize what was discussed in past meetings. One way to achieve this is by converting the entire conversation to text using existing speech to text algorithms. However, these algorithms are often inaccurate for free-format speech that does not follow any specific grammar. Also, running these algorithms in the mobile electronic device 120 (FIG. 2) (as opposed to running in the cloud) is challenging. Therefore, in one embodiment the system 300 does not target conversion of the entire conversation during meetings to text.

In one embodiment, the system 300 detects specific keywords from the conversation during the meetings in real-time. These keywords may be specified by the users apriori, or may be extracted from the calendar events automatically as described above. The source of the keywords is not critical for this part of the system 300 as the focus is on detecting the keywords from speech in real-time. This can also help in indexing the timeline meetings by tagging specific meeting segments with the keywords that were uttered during this time. Each meeting can be summarized with a timeline which covers set of segments with keywords. Users can search and retrieve meeting dialogue for listening to segments that they are interested in.

Figure 8A:
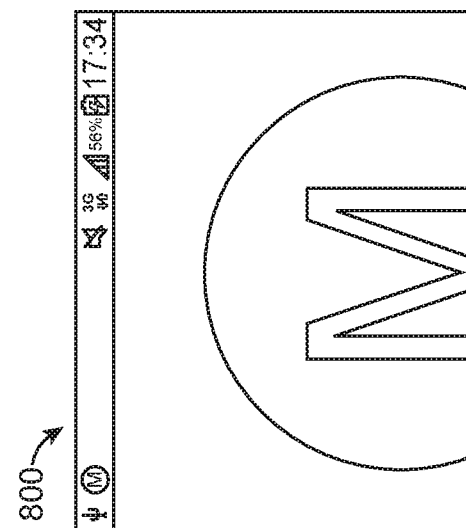
FIG. 8A shows an example screen display for a start screen for meeting detection and analysis, according to an embodiment.
Figure 8B:
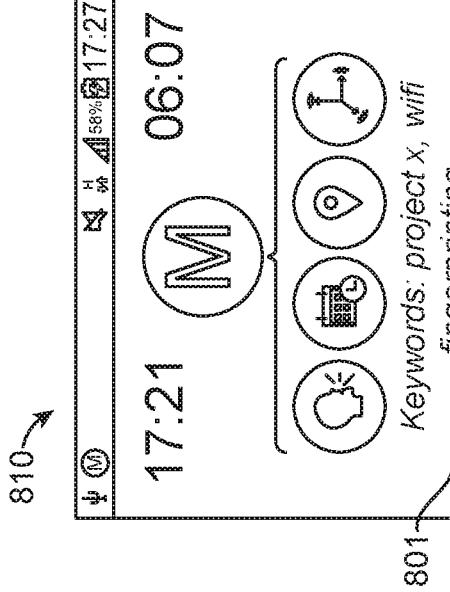
FIG. 8B shows an example screen display for a meeting detection and analysis feature selection, according to an embodiment.
Figure 8C:
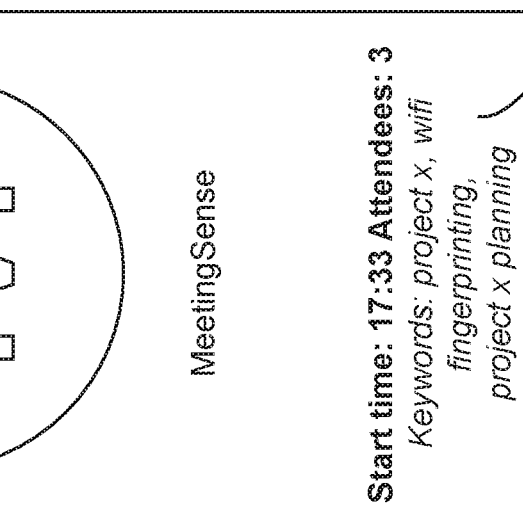
FIG. 8C shows an example screen display for a search and view meetings feature selection, according to an embodiment.

In one example embodiment, the system 300 uses existing tools to detect keywords from speech in real-time as it preserves privacy by running solely on the mobile electronic device 120 without any assistance from the cloud. Some embodiments require the system 300 to specify the set of keywords that it needs to detect. However, a challenge in using some tools is that they need specifying thresholds that control the accuracy in differentiating the keywords from other regular words. The thresholds vary for different keywords and users. In one embodiment, the tools are trained for different users based on training data. For each speaker, the system 300 collects audio data when the speaker reads, for example, a paragraph composed of the set of all keywords (either specified by the users or extracted by the system 300), and other random (e.g., English) words. In one embodiment, the system 300 uses these audio recordings to calculate the optimum threshold values for each keyword and speaker. The optimum thresholds values are calculated based on the precision and recall of the system. Once calculated, the system 300 uses these values in real-time for detecting keywords. As the speaker recognition process in the system 300 automatically identifies the speaker of each segment, this allows the system 300 to use the thresholds specific to that particular speaker. In one embodiment, the system 300 includes several screen displays, an example of screen displays are shown in FIGS. 8A-C as described below.

Figure 7:
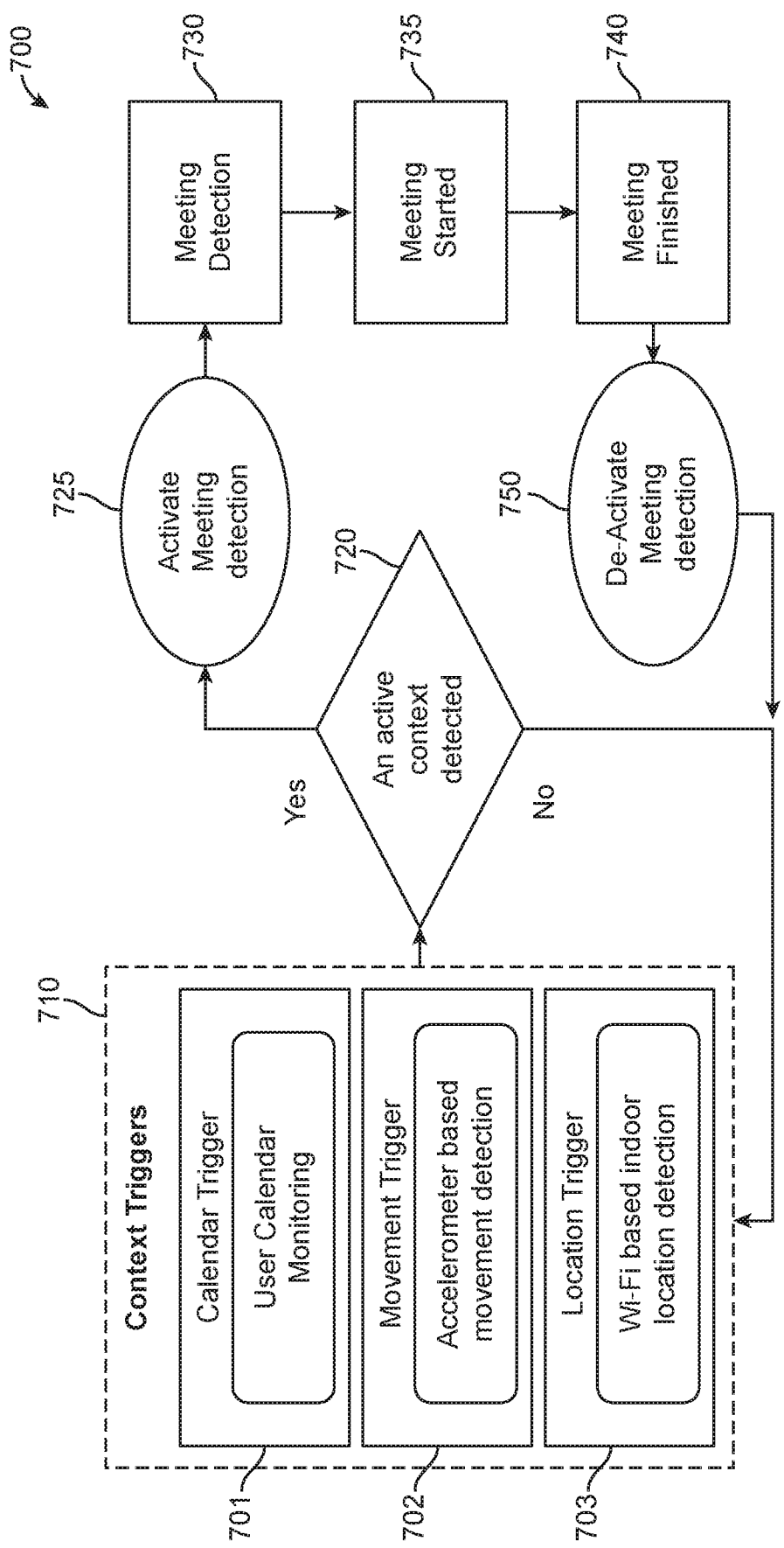
FIG. 7 shows a flow for intelligent context triggers for mobile device power savings, according to an embodiment.

FIG. 7 shows a flow 700 for intelligent context triggers 710 for mobile device power savings, according to an embodiment. Energy is the main limiting factor for smartphone apps, as these devices are powered by a limited capacity battery. Continuous data collection from audio, Wi-Fi, and accelerometer sensors leads to rapid depletion of the user's smartphone's battery. Since users at organizations are not always in meetings, in practice, there is no need to always run the system 300. Therefore, intelligent triggers are designed to activate/inactivate system 300. In one embodiment, the intelligent context triggers 710 include calendar trigger 701 (user calendar application 127 (FIG. 3) monitoring), movement trigger 702 (accelerometer 131 based movement detection) and location trigger 703 (Wi-Fi 130 based indoor location detection).

In one embodiment, the movement trigger 702 activates meeting detection when movement is detected (e.g., using the accelerometer 131). The calendar trigger 701 activates meeting detection well before a meeting, e.g., 30 minutes before the start of a meeting. The location trigger 703 activates meeting detection only when the user is in a meeting zone. These are referred to as active contexts (e.g., 1) Movement, 2) Being in a meeting zone, and 3) A calendar event in the next 30 minutes).

In one embodiment, in block 720 it is determined if an active context is detected. If no active context is detected, the flow proceeds back to context triggers 710. If an active context is detected in block 720, then the flow proceeds to block 725 where the meeting detection is activated. Flow 700 proceeds to block 730 where meeting detection is determined, to block 735 where the meeting started is determined and to block 740 where meeting finished is determined. In one embodiment, after the meeting finished is determined the flow 700 proceeds to block 750 where the automatic meeting detection is deactivated.

FIG. 8A shows an example screen display for a start screen 800 for meeting detection and analysis, according to an embodiment. As shown, the start screen 800 includes start time, number of attendees, and keywords 801. FIG. 8B shows an example screen display 810 for a meeting detection and analysis feature selection, according to an embodiment. As shown, in one example the screen display 810 includes icons for selection of various context icons (e.g., microphone, calendar, location and movement) to turn on/off according to the user's context, e.g., when the user is speaking the voice icon changes to a different color (e.g., blue color). Additionally, the screen display 810 shows the meeting start time, duration, keywords 801, analytic feedbacks such as speech percentages using a pie chart 802, and a timeline of speakers 803. FIG. 8C shows an example search and view meetings screen display 820. Other screen displays, such as on-device location training screen, preferences, etc. may also be implemented. In one example, search results 804 are displayed after the system 300 performs a search.

Figure 9:
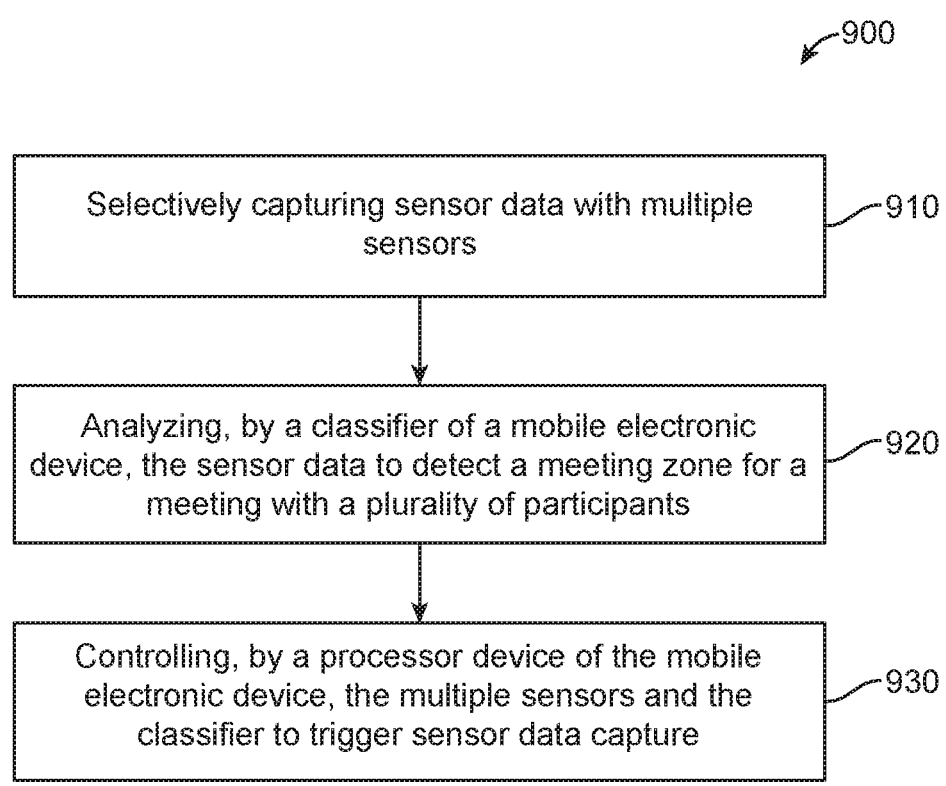
FIG. 9 shows a process for automatic meeting detection, according to one embodiment.

FIG. 9 shows a process 900 for automatic meeting detection, according to one embodiment. In one embodiment, in block 910 sensor data is selectively captured with multiple sensors (e.g., sensors 131, FIG. 2). In block 920 process 900 analyzes, by a classifier (e.g., (fusion) classifier 320 (FIG. 3) of a mobile electronic device 120 (FIG. 2), the sensor data to detect a meeting zone for a meeting with multiple participants (e.g., with at least one participant present in a meeting zone (where other participants may be telephonically participating). In block 930 process 900 controls, by a processor device of the mobile electronic device, the multiple sensors and the classifier to trigger sensor data capture.

In one embodiment, process 900 may further include interfacing (e.g., by the processor device), with a calendaring application to extract keywords and meeting time information, updating the calendar information, determining location information for the meeting zone, and detecting (e.g., by the classifier), a start time and an end time for the meeting.

In one embodiment, process 900 may further include providing (e.g., by the processor device), analytic feedback based on the sensor data to a display of the mobile electronic device (e.g., pie chart 802, FIG. 8B). In one embodiment, process 900 may still further include controlling communication features during the meeting (e.g., turning on/off reception of telephone calls when the user is in a meeting), and providing context aware messaging for particular incoming communications (e.g., sending an SMS message that a participant is in a meeting, is busy, etc.). Process 900 may further include using calendar application (e.g., calendar application 127, FIG. 3) information and the sensor data to reduce energy usage for the mobile electronic device.

In one embodiment, process 900 may further include generating an indoor map including a label for the determined location information (e.g., determining a meeting zone and using an indoor map to label the determined meeting zone on the indoor map). Process 900 may additionally include updating presence information for a shared access calendar for the calendaring application (e.g., on a user's mobile electronic device 120) based on the detected start time, number of participants and the determined location information.

In one embodiment, the system 300 may include intelligent silencing of mobile electronic device 120 (FIG. 2) notifications (e.g., call, text, email, etc.). In one embodiment, when the system 300 detects that the user is in a meeting, the mobile electronic device 120 can be automatically silenced, so that the user is not disturbed while in a meeting (e.g., turning on silent mode). In one embodiment, since a user of the mobile electronic device 120 might want to receive work related messages, especially from meeting attendees (e.g., some attendees may email that they are not joining the meeting), the system 300 intelligently enables notifications that might be of interest to the user during the meeting (e.g., enabling calls from calendar attendees or related personnel), while other callers may be blocked.

In one embodiment, system 300 provides context-aware notifications to the user's contacts. In one example, if the user receives a call while in a meeting, an SMS message/email is sent to the caller informing that the user is in a meeting, is busy, etc. When the meeting finishes, the caller is sent another message that the user is no longer in a meeting, is not busy, etc. and can call back. If the user receives a call from someone at work (e.g., trusted contacts), then the exact meeting location and times are sent to the caller, e.g., user is in a meeting in room 1 with Tom and Mike, etc.

In one embodiment, the system 300 provides automatic sharing of the presence information with the calendar application 127 (FIG. 3) and other users. When the system 300 detects that the user is in a meeting, the user's shared calendar can be updated with the meeting information such as the following: actual meeting start time, actual number of participants (obtained from voice analysis), actual meeting room (obtained from meeting room classification).

In one embodiment, when the system 300 detects that the user is in a meeting zone, the meeting room information can be automatically inferred by system 300. The detected point of interest (POI) information (room name, capacity (e.g., using the number of participants), and location) can be added on to the indoor map (e.g., adding a generated "meeting" label or overlay onto a previously generated indoor map) generated by a mapping feature by comparing the similarity of the Wi-Fi signals.

In one embodiment, system 300 may provide automatic generation of meeting minutes. When the system detects that the user is in a meeting, the system can trigger an automatic meeting minutes generator. When the meeting finishes, the system can detect that the meeting has finished and stop the automatic meeting minutes generator. The generated meeting minutes can be attached to the calendar event automatically. In one embodiment, the system may not capture every spoken word of the meeting, but may instead be triggered based on extracted keywords, keywords provided in a calendar event, etc.

One or more embodiments automatically detect meeting zones, meeting start and end accurately using a mobile electronic device 120 (FIG. 2) without assistance from a cloud, server, etc. Most conventional systems depend on the calendar application. However, it has been shown that calendar applications do not represent the reality accurately as many meetings do not start or end as intended. Calendar applications contain many place holders, therefore, it is a challenge for differentiating a place holder (e.g., pick up groceries) from a real meeting. Some conventional systems depend on external sensors (such as room occupancy sensors or pressure sensors in chairs) for detecting whether a user is in a meeting or not. However, these solutions are not scalable. The system 300 does need to depend on external sensors or for any interaction between multiple mobile devices and a cloud computing environment for detecting meeting rooms and presence. Additionally, by running solely on a mobile electronic device 120, the system 300 preserves privacy of the user.

One or more embodiments provide improvements to another technology or technical field by conserving battery life by using context to turn on and off of system processing and sensor collection; provide privacy of user information and data by solely operating on a mobile electronic device 120 (FIG. 2), effects transformation or reduction of a particular article to a different state or thing based on capturing sensor data and transforming the raw sensor data to information used for analysis and processing; and includes processing, analysis, feedback analytics, and communications other than what is well understood, routine and conventional in the field.

FIG. 10 is a high-level block diagram showing an information processing system comprising a computing system 1000 implementing one or more embodiments. The system 1000 includes one or more processors 1011 (e.g., ASIC, CPU, etc.), and may further include an electronic display device 1012 (for displaying graphics, text, and other data), a main memory 1013 (e.g., random access memory (RAM), cache devices, etc.), storage device 1014 (e.g., hard disk drive), removable storage device 1015 (e.g., removable storage drive, removable memory, a magnetic tape drive, optical disk drive, computer-readable medium having stored therein computer software and/or data), user interface device 1016 (e.g., keyboard, touch screen, keypad, pointing device), and a communication interface 1017 (e.g., modem, wireless transceiver (such as Wi-Fi, Cellular), a network interface (such as an Ethernet card), a communications port, or a PCMCIA slot and card).

The communication interface 1017 allows software and data to be transferred between the computer system and external devices through the Internet 1050, mobile electronic device 1051, a server 1052, a network 1053, etc. The system 1000 further includes a communications infrastructure 1018 (e.g., a communications bus, cross bar, or network) to which the aforementioned devices/interfaces 1011 through 1017 are connected.

The information transferred via communications interface 1017 may be in the form of signals such as electronic, electromagnetic, optical, or other signals capable of being received by communications interface 1017, via a communication link that carries signals and may be implemented using wire or cable, fiber optics, a phone line, a cellular phone link, an radio frequency (RF) link, and/or other communication channels.

In one implementation of one or more embodiments in a mobile wireless device (e.g., a mobile phone, smartphone, tablet, mobile computing device, wearable device, etc.), the system 1000 further includes an image capture device 1020, such as a camera 128 (FIG. 2), and an audio capture device 1019, such as a microphone 122 (FIG. 2). The system 1000 may further include application interfaces as MMS interface 1021, SMS interface 1022, email interface 1023, social network interface (SNI) 1024, audio/video (AV) player 1025, web browser 1026, image capture interface 1027, etc.

In one embodiment, the system 1000 includes meeting detection and analysis processing interface 1030 that may implement system 300 processing as described in FIG. 3. In one embodiment, the meeting and analysis processing interface 1030 may implement the system 300 (FIG. 3) and flow diagrams 400 (FIG. 4), 500 (FIG. 5), 600 (FIG. 6), 700 (FIG. 7) and 900 (FIG. 9). In one embodiment, the meeting detection and analysis processing (e.g., processor, interface, etc.) 1030 along with an operating system 1029 may be implemented as executable code residing in a memory of the system 1000. In another embodiment, the meeting detection and analysis processing interface 1030 may be provided in hardware, firmware, etc.

As is known to those skilled in the art, the aforementioned example architectures described above, according to said architectures, can be implemented in many ways, such as program instructions for execution by a processor, as software packages, microcode, as computer program product on computer readable media, as analog/logic circuits, as application specific integrated circuits, as firmware, as consumer electronic devices, AV devices, wireless/wired transmitters, wireless/wired receivers, networks, multi-media devices, as hardware interfaces, etc. Further, embodiments of said Architecture can take the form of an entirely hardware embodiment, an embodiment containing both hardware and software elements, etc.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software packages or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A mobile electronic device comprising:
    multiple sensors configured to selectively capture sensor data; and
    a processor device executing instructions stored in a memory of the mobile electronic device, the instructions comprising a classifier configured to:
        analyze the sensor data to detect a meeting zone for a meeting with a plurality of participants;
        identify one or more speakers of collected audio samples;
        process captured network information from a meeting location; and
        associate the network information to the meeting zone for detection of presence of the meeting zone;
    the processor device executing further instructions stored in the memory of the mobile electronic device further configured to:
        control the multiple sensors and the classifier to trigger capture of the sensor data;
        control communication features comprising turning on and off reception of telephone calls during the meeting;
        provide context aware messaging comprising:
            detecting a participant of the plurality of participants is in the meeting;
            receiving, from a caller, an incoming call for the participant during the meeting; and
            sending a message to the caller notifying that the participant is in the meeting in response to the participant receiving the incoming call from the caller during the meeting;
        obtain participation patterns of the plurality of participants during the meeting by processing on the mobile electronic device the collected audio samples;
        delete the collected audio samples after the processing, such that the collected audio samples are not stored; and
        provide analytic feedback comprising the participation patterns.

2. The mobile electronic device of claim 1, wherein the processor device is further configured to:
    interface with a calendaring application to extract keywords and meeting time information for the meeting;
    update calendar information;
    determine location information for the meeting zone; and
    analyze dialogue of the meeting based on identification of the one or more speakers.

3. The mobile electronic device of claim 2, wherein the classifier is further configured to detect a start time and an end time for the meeting, and the processor device is further configured to display visualizations with speaker percentages for the one or more speakers.

4. The mobile electronic device of claim 1, wherein the participation patterns are further based on the sensor data, the analytic feedback is provided to a display of the mobile electronic device, the mobile electronic device is a smart phone, and the sensor data comprises accelerometer data that is used for detection of start or finish of the meeting.

5. The mobile electronic device of claim 1, wherein the processor device is further configured to reduce energy usage for the mobile electronic device based on calendar information and the sensor data;
    wherein the message comprises one of a text message, an email, or a combination thereof; and
    wherein the context of the meeting comprises at least one of a type of the meeting and a time of the meeting.

6. The mobile electronic device of claim 2, wherein the processor device is further configured to generate an indoor map including a label for the determined location information.

7. The mobile electronic device of claim 3, wherein the processor device is further configured to update presence information for a shared access calendar for the calendaring application based on the detected start time, a number of participants in the meeting, and the determined location information.

8. The mobile electronic device of claim 3, wherein the classifier is further configured to detect the start time and the end time of the meeting based on captured audio signals, the calendar information, the determined location information, and motion information of the mobile electronic device.

9. The mobile electronic device of claim 1, wherein the sensor data, analysis results from the classifier, the analytic feedback, and processing information from the processor device remain stored in the memory of the mobile electronic device for information privacy, and the network information comprises scanned media access control (MAC) addresses of access points and a number of times a beacon frame is received from each access point.

10. A method comprising:
selectively capturing sensor data with multiple sensors;
executing, by a processor device of a mobile electronic device, instructions stored in a memory of the mobile electronic device, the instructions comprising:
  a classifier that:
    analyzes the sensor data to detect a meeting zone for a meeting with a plurality of participants;
    identifies one or more speakers of collected audio samples;
    processes captured network information from a meeting location; and
    associates the network information to the meeting zone for detection of presence of the meeting zone;
  controlling, by the processor device, the multiple sensors and the classifier to trigger capture of the sensor data;
  controlling, by the processor device, communication features comprising turning on and off reception of telephone calls during the meeting;
  providing, by the processor device, context aware messaging comprising:
    detecting a participant of the plurality of participants is in the meeting;
    receiving, from a caller, an incoming call for the participant during the meeting; and
    sending a message to the caller notifying that the participant is in the meeting in response to the participant receiving the incoming call from the caller during the meeting;
  obtaining, by the processor device, participation patterns of the plurality of participants during the meeting by processing, on the mobile electronic device, the collected audio samples;
  deleting, by the processor device, the collected audio samples after the processing, such that the collected audio samples are not stored; and
  providing, by the processor device, analytic feedback comprising the participation patterns.

11. The method of claim 10, further comprising:
interfacing, by the processor device, with a calendaring application to extract keywords and meeting time information for the meeting;
updating, by the processor device, calendar information;
determining, by the processor device, location information for the meeting zone;
analyzing, by the processor device, dialogue of the meeting based on identification of the one or more speakers; and
detecting, by the classifier, a start time and an end time for the meeting, wherein:
  the sensor data comprises accelerometer data that is used for detection of start or finish of the meeting; and
  the network information comprises scanned media access control (MAC) addresses of access points and a number of times a beacon frame is received from each access point.

12. The method of claim 11, further comprising:
displaying, by the processor device, visualizations with speaker percentages for the one or more speakers;
wherein the participation patterns are further based on the sensor data, the analytic feedback is provided to a display of the mobile electronic device, and the mobile electronic device is a smart phone.

13. The method of claim 11, further comprising:
using, by the processor device, calendar information and the sensor data to reduce energy usage for the mobile electronic device;
wherein the context of the meeting comprises at least one of a type of the meeting and a time of the meeting; and
wherein the message comprises one of a text message, an email, or a combination thereof.

14. The method of claim 11, further comprising:
generating, by the processor device, an indoor map including a label for the determined location information.

15. The method of claim 11, further comprising:
updating, by the processor device, presence information for a shared access calendar for the calendaring application based on the detected start time, a number of participants in the meeting, and the determined location information.

16. A non-transitory processor-readable medium that includes a program that when executed by a processor of a mobile electronic device performs a method comprising:
selectively capturing sensor data with multiple sensors;
executing, by the processor, instructions stored in a memory of the mobile electronic device, the instructions comprising:
  a classifier that:
    analyzes the sensor data to detect a meeting zone for a meeting with a plurality of participants;
    identifies one or more speakers of collected audio samples; processes captured network information from a meeting location; and
    associates the network information to the meeting zone for detection of presence of the meeting zone;
  controlling, by the processor, the multiple sensors and the classifier to trigger capture of the sensor data;
  providing, by the processor, context aware messaging comprising:
    detecting a participant of the plurality of participants is in the meeting;
    receiving, from a caller, an incoming call for the participant during the meeting; and
    sending a message to the caller notifying that the participant is in the meeting in response to the participant receiving the incoming call from the caller during the meeting;
  obtaining, by the processor, participation patterns of the plurality of participants during the meeting by processing on the mobile electronic device the collected audio samples;
  deleting, by the processor, the collected audio samples after the processing, such that the collected audio samples are not stored;
  providing, by the processor, analytic feedback comprising the participation patterns; and
  controlling, by the processor, communication features comprising turning on and off reception of telephone calls during the meeting.

17. The non-transitory processor-readable medium of claim 16, wherein the program when executed by the processor performs the method further comprising:
interfacing, by the processor, with a calendaring application to extract keywords and meeting time information for the meeting;
updating, by the processor, calendar information;
determining, by the processor, location information for the meeting zone;

analyzing, by the processor, dialogue of the meeting based on identification of the one or more speakers; and detecting, by the classifier, a start time and an end time for the meeting;

wherein the participation patterns are further based on the sensor data, the analytic feedback is provided to a display of the mobile electronic device, and the mobile electronic device is a smart phone.

18. The non-transitory processor-readable medium of claim 16, wherein the program when executed by the processor performs the method further comprising:

using, by the processor, calendar information and the sensor data to reduce energy usage for the mobile electronic device;

wherein:
the sensor data comprises accelerometer data that is used for detection of start or finish of the meeting;
the network information comprises scanned media access control (MAC) addresses of access points and a number of times a beacon frame is received from each access point;
the context of the meeting comprises at least one of a type of the meeting and a time of the meeting; and
the message comprises one of a text message, an email, or a combination thereof.

19. The non-transitory processor-readable medium of claim 17, wherein the program when executed by the processor performs the method further comprising:

generating, by the processor, an indoor map including a label for the determined location information; and displaying, by the processor, visualizations with speaker percentages for the one or more speakers.

20. The non-transitory processor-readable medium of claim 17, wherein the program when executed by the processor performs the method further comprising:

updating, by the processor, presence information for a shared access calendar for the calendaring application based on the detected start time, a number of participants in the meeting, and the determined location information.

* * * * *